(12) United States Patent
Goorts et al.

(10) Patent No.: US 11,315,333 B2
(45) Date of Patent: Apr. 26, 2022

(54) EDGE DETECTION AND SMOOTHING FOR VIRTUAL OBJECT PRESENTATION

(71) Applicant: Magic Leap, Inc., Plantation, FL (US)

(72) Inventors: Patrik Goorts, Hasselt (BE); Steven Maesen, Hasselt (BE); Daniel Stephen Speelman, Fairview, PA (US); Robert David Berkebile, Phoenix, MD (US); Steven Robb Dobos, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/080,174

(22) Filed: Oct. 26, 2020

(65) Prior Publication Data

US 2021/0125413 A1 Apr. 29, 2021

Related U.S. Application Data

(60) Provisional application No. 62/926,714, filed on Oct. 28, 2019.

(51) Int. Cl.
*G06T 19/00* (2011.01)
*G06T 5/00* (2006.01)
*H04N 13/344* (2018.01)
*G06T 17/20* (2006.01)

(52) U.S. Cl.
CPC ............ *G06T 19/006* (2013.01); *G06T 5/002* (2013.01); *G06T 17/20* (2013.01); *H04N 13/344* (2018.05)

(58) Field of Classification Search
CPC combination set(s) only.
See application file for complete search history.

(56) References Cited

U.S. PATENT DOCUMENTS

| 8,736,636 | B2 | 5/2014 | Kang |
| 8,793,770 | B2 | 7/2014 | Lim |
| 8,823,855 | B2 | 9/2014 | Hwang |
| 8,874,673 | B2 | 10/2014 | Kim |
| 2019/0213778 | A1 | 7/2019 | Du et al. |

(Continued)

FOREIGN PATENT DOCUMENTS

| WO | WO2018162509 A2 | 9/2018 |
| WO | WO2018224847 A2 | 12/2018 |

OTHER PUBLICATIONS

Hu, Guo-Fei, Qun-Sheng Peng, and A. Robin Forrest. "Robust mesh smoothing." Journal of Computer Science and Technology 19.4 (2004): 521-528. (Year: 2004).*

(Continued)

*Primary Examiner* — Ryan M Gray
(74) *Attorney, Agent, or Firm* — Fish & Richardson P.C.

(57) ABSTRACT

Image processing techniques for rendering holographic images are described. Image data captured from cameras can be converted into a triangle mesh. The triangle mesh may be processed by determining the location of edges, normals, and edge distances in the mesh. Mesh and edge smoothing can be performed on the mesh to reduce noise and jagged edges. Additional mesh cleanup and simplification can be performed to reduce the number of vertices and triangles and enhance the qualify of the mesh. Data from the resulting mesh can be transmitted to a receiving device where the mesh data is used to reproduce a holographic image of the image data captured by the depth sensors.

20 Claims, 7 Drawing Sheets

(56) References Cited

U.S. PATENT DOCUMENTS

2019/0394443 A1* 12/2019 Schickel ............... H04N 5/272
2020/0082618 A1* 3/2020 Lu ......................... G06T 5/002

OTHER PUBLICATIONS

Li, Zhong, et al. "A new feature-preserving mesh-smoothing algorithm." The visual computer 25.2 (2009): 139-148. (Year: 2009).*
Kalvin, Alan D., and Russell H. Taylor. "Superfaces: Polygonal mesh simplification with bounded error." IEEE Computer Graphics and Applications 16.3 (1996): 64-77. (Year: 1996).*
PCT International Search Report and Written Opinion in International Appln. No PCT/US2020/057395, dated Jan. 22, 2021, 6 pages.

\* cited by examiner

Edge smoothing

Edge smoothing →

Mesh simplification

EDGE DETECTION AND SMOOTHING FOR VIRTUAL OBJECT PRESENTATION

CROSS-REFERENCE TO RELATED APPLICATION

This application claims the benefit under 35 U.S.C. § 119(e) of U.S. Patent Application No. 62/926,714, entitled "Reconstructed Virtual Object Presentation," filed Oct. 28, 2019, which is incorporated herein by reference in its entirety.

FIELD

This specification generally relates to image processing in virtual or augmented reality systems.

BACKGROUND

Virtual or augmented reality (VAR) systems can be used to display virtual content to augment physical reality views. However, three-dimensional (3-D) holographic images rendered by VAR display systems may suffer from low quality due to noise and compromised volumetric reconstruction.

SUMMARY

Innovative aspects of the subject matter described in this specification relate to improved volumetric reconstruction of images using enhanced edge detection and smoothing techniques.

Innovative aspects of the subject matter described in this specification include, in some implementations, a computer-implemented method comprising several operations. The operations include obtaining image data from a pair of cameras; determining a mesh of triangles from the image data; performing mesh smoothing and edge smoothing to remove noise from the mesh of triangles; removing one or more vertices from the mesh that do not satisfy a contribution threshold; storing, in a memory, mesh data that characterizes the mesh after the removing of the one or more vertices from the mesh; and transmitting the mesh data to a rendering device configured to render a holographic image based on the mesh data.

Implementations may each optionally include one or more of the following features. For instance, in some implementations, the computer-implemented method includes the operation of determining edges for the triangles. This can be accomplished for by performing a set of operations for each vertex in the mesh. The set of operations include determining a neighboring vertex that is located one vertex away from the vertex; determining whether the neighboring vertex and the vertex share a common triangle; determining that the neighboring vertex and the vertex are internal nodes of the mesh when the neighboring vertex and the vertex are shared by at least two triangles; and determining that the neighboring vertex and the vertex are external nodes of the mesh when the neighboring vertex and the vertex are part of one triangle.

In some implementations, the computer-implemented method includes determining, for each internal node, a distance to an edge of the mesh. The distance is a number of hops to get to the edge from the internal node.

In some implementations, the operation of performing mesh smoothing and edge smoothing includes performing a set of operations for each vertex. The set of operations include determining an average location of vertices that share a triangle with the vertex, and modifying a location of the vertex to be closer to the average location of the vertices that share a triangle with the vertex.

In some implementations, the operation of performing mesh smoothing and edge smoothing includes identifying a vertex located a determined number of hops from a particular edge of the mesh; identifying other vertices that share a triangle and that are located the determined number of hops from the particular edge; determining an average location of the other vertices; and modifying a location of the vertex such that the location of the vertex is closer to the average location.

In some implementations, the computer-implemented method includes determining that two vertices are separated by a distance that is less than a threshold distance, and merging the two vertices.

In some implementations, the operation of removing one or more vertices from the mesh that do not satisfy the contribution threshold includes identifying a pair of vertices that belong to the same triangle; determining an effect on the mesh if the pair of vertices are merged; and determining that the effect on the mesh is less than the contribution threshold.

In some implementations, the operation of determining the effect on the mesh when the pair of vertices are merged includes determining a change in angle between all neighboring triangles before and after the pair of vertices are merged.

In some implementations, the computer-implemented method includes removing one or more triangles from the mesh before removing the one or more vertices by removing one or more triangles that form a submesh in the mesh.

In some implementations, the mesh data includes data indicative of color in one or more images and depth from the pair of cameras to a pixel in the one or more images.

Aspects of the subject matter described in this specification also include, in some implementations, a virtual or augmented reality system that includes a frame structure, a computing device, a memory, and a headset. The frame structure includes a pair of depth sensors configured to obtain image data. The computing device is coupled to the frame structure. The computing device is configured to obtain image data from the pair of depth sensors; determine a mesh of triangles from the image data; perform mesh smoothing and edge smoothing to remove noise from the mesh of triangles; and remove one or more vertices from the mesh that do not satisfy a contribution threshold. The memory is configured to store mesh data that characterizes the mesh after removing the one or more vertices from the mesh. The headset is configured to render a holographic image based on the mesh data.

Aspects of the subject matter described in this specification also include, in some implementations, a non-transitory computer-readable storage medium that includes instructions, which, when executed by one or more computing devices, cause the one or more computing devices to perform operations. The operations include obtaining image data from a pair of cameras; determining a mesh of triangles from the image data; performing mesh smoothing and edge smoothing to remove noise from the mesh of triangles; removing one or more vertices from the mesh that do not satisfy a contribution threshold; storing, in a memory, mesh data that characterizes the mesh after the removing of the one or more vertices from the mesh; and transmitting the mesh data to a rendering device configured to render a holographic image based on the mesh data.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Holograms are a part of an immersive visual collaboration experience that allow various participants to virtually interact with each other. Instead of talking to a screen, a user can manipulate virtual content in a shared digital space to engage in virtual activities, e.g., playing virtual chess with another user. Holograph technology and VAR systems has applications in several areas such as, e.g., electronic games, online education, virtual assistance, shared work environment, telepresence, and remote collaboration.

While VAR systems have often used holographic projections to display images and content to users, VAR systems have struggled to effectively enable user interaction with holographic projections. Constraints, such as a network's or computing device's inability to handle large volumes of image data, have impacted the ability to stream and render satisfactory holographic projections in real time.

In some systems where sufficient system resources are available, the quality of holographic projections has still been low due to poor holographic rendering. For example, holographic images may appear wavy or jagged due to noise artifacts present at the edges of an object such as a person. Such quality issues not only have a negative impact on a user's viewing experience, but they also make it difficult to interact with the holographic projections because the boundaries of objects are not clearly defined or visible. The following disclosure describes systems and methods for addressing this problem and enhancing user experience of interacting with holographic images and displays.

As explained in more detail herein below, image data can be captured from depth sensors and a triangle mesh may be generated from the image data. The triangle mesh may be processed by determining the location of edges, normals, and edge distances in the mesh. Using this information, mesh and edge smoothing can be performed to reduce noise and jagged edges. Additional operations such as texture projection and mesh cleanup and simplification to reduce the number of vertices and triangles can be performed to enhance the quality of the mesh. Data from the resulting mesh can be transmitted to a receiving device where the mesh data is used to reproduce a holographic image of the image data captured by the depth sensors.

This method of edge detection and mesh smoothing described in this disclosure is advantageous because it can be performed with very low latency thereby allowing real time rendering of streaming image data. In addition, the methods and systems described in this disclosure can easily be integrated into new and existing applications to enhance user experience across various platforms.

Figure 1:
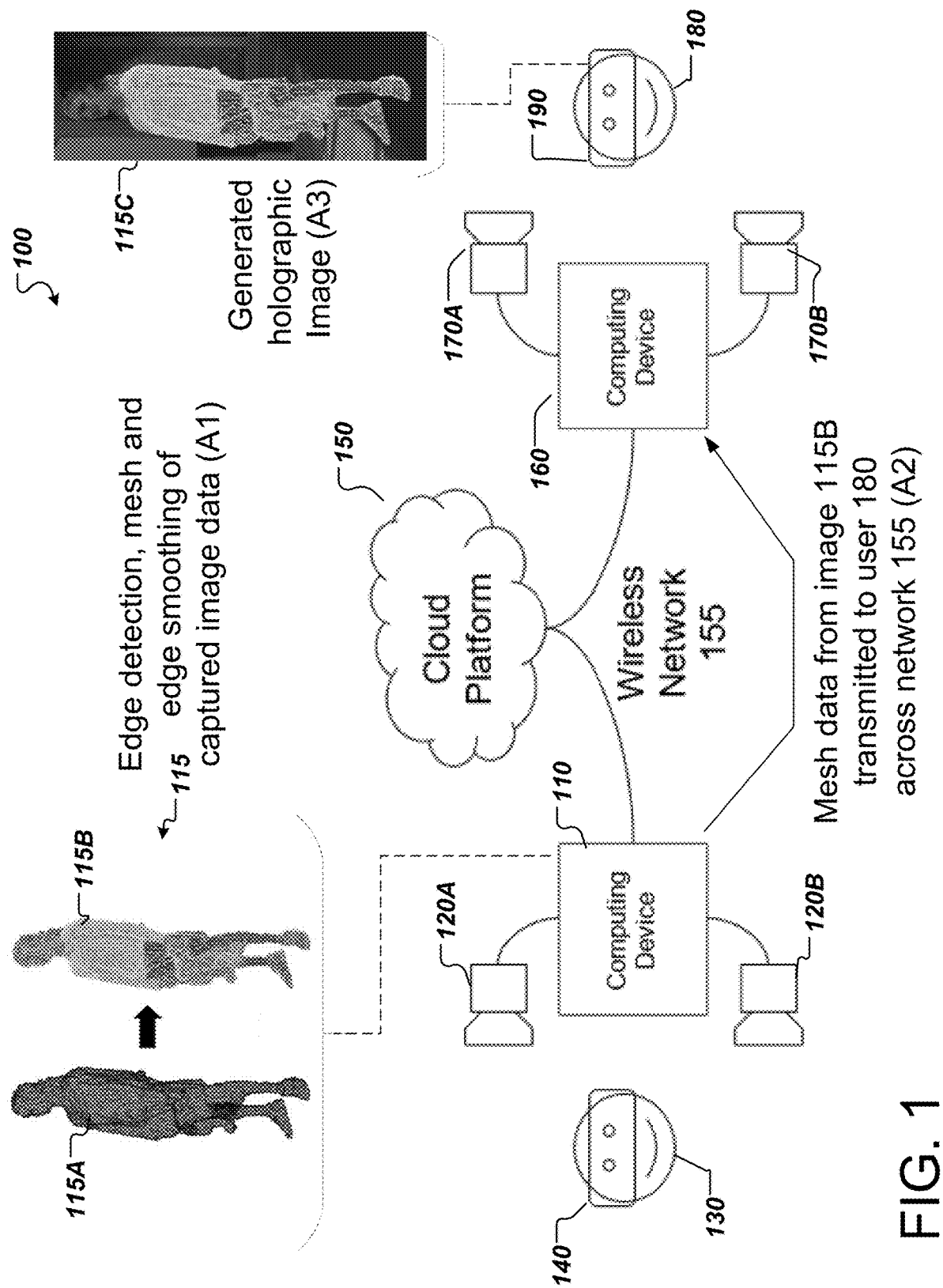
FIG. 1 depicts an example of a virtual or augmented reality (VAR) system having a dual sensor platform.

FIG. 1 depicts an example VAR system 100 having a dual sensor platform. The system 100 can include a cloud platform 150, at least two computing devices 110, 160, at least two headsets 140, 190, and at least two sensor mounts 120A, 120B, 170A, 170B to render holographic images for users 130, 180. The two users 130, 180 can communicate with each other through the VAR system 100.

User 130 can wear headset 140 and can utilize computing device 110 to interact with the VAR system 100. The computing device 110 can be connected to one or more depth sensors 120A and 120B, which combined form part of a sensor mount. The computing device 110 can also be connected in a wired or wireless manner to headset 140. Similarly, user 180 can wear headset 190 and can utilize computing device 160 to interact with the VAR system 100. The computing device 160 can be connected to two depth sensors 170A and 170B, which combined form part of another sensor mount. The computing device 160 can also be connected in a wired or wireless manner to headset 190.

Headsets 140 and 190 can be mounted onto the heads of users 130 and 180, respectively. Each headset 140, 190 can include a stereoscopic head-mounted display to provide separate images for each eye, stereo sound, and head motion tracking sensors, e.g., gyroscopes, accelerometers, and/or magnetometers. In some implementations, headsets 140, 190 can also include eye movement tracking sensors.

Each headset 140, 190 can include a pair of lenses for mapping a display to a wide field of view. The headsets 140, 190 can include one or more cameras to capture real word images that are displayed along with virtual objects in an augmented view provided to the users 130, 180. In some implementations, the headsets 140, 190 can include or be coupled to one or more sensors and processors to perform calibration for properly aligning virtual objects with real world images.

Headsets 140, 190 can also be used to view holographic images. For example, image data captured by depth sensors 120A and 120B can be transmitted for rendering a holographic image viewable through headset 190 worn by user 180. Similarly, image data captured by depth sensors 170A and 170B can be transmitted for rendering a holographic image viewable through headset 140 worn by user 130.

Each computing device 110, 160 can be connected to a sensor mount which can include one or more depth sensors. For example, computing device 110 is connected to depth sensors 120A and 120B, and computing device 160 is connected to depth sensors 170A and 170B. Each depth sensor 120A, 120B, 170A, 170B can capture a stream of red, green, blue (RGB) images and data to generate a depth map. By combining data from one or more depth sensors or cameras in each sensor mount, data obtained by the sensor mount can be used to generate three-dimensional (3D) images of users 130 or 180. These virtual representations of user 130 or 180 are sent to their counterparts to be aligned with virtual objects and combined with real world images.

Computing device 110 may be the same or similar to computing device 160 except that computing device 110 is associated with user 130 and computing device 160 is associated with user 180. In particular, computing device 110 can receive data from and/or transmit data to user 130, headset 140, depth sensors 120A, 120B, and cloud platform 150. Computing device 160 can receive data from and/or transmit data to user 180, headset 190, depth sensors 170A, 170B, and cloud platform 150. In some implementations, the computing devices 110, 180 can each be a computer such as a laptop or desktop, and can be configured to process large volumes of graphical data.

Each of computing devices 110 and 160 can include one or more processors, memories, user interfaces (e.g., a display, a mouse, a microphone, a speaker), a communication interface, and a transceiver, among various other components. For example, each computing device 110/160 can include one or more graphical processing units (GPUs) to process large amounts of raw image data obtained from the depth sensors 120A, 120B, 170A, 170B into a smooth hologram, compressing it to bandwidths comparable to streaming high-definition (HD) videos.

In particular, a GPU in computing device 110 or 160 can generate a sensor depth map for images captured by a depth sensor 120A, 120B, 170A, 170B, determine the 3D space to match the sensor depth map, determine a smooth mesh geometry in the matched 3D space, perform simplification of the geometry to reduce the amount of graphical data points, and project color images to the geometry as a texture and blend these images at overlapping edges. These operations are described in more detail with respect to FIG. 2.

Image set 115, including images 115A and 115B, provides an example of the type of image processing performed by the GPU. For example, an image of a person can be captured by depth sensors 120A and 120B. A mesh of triangles can be generated from the image and edges in the mesh can be determined, as shown in image 115A. The mesh and edges may be smoothened and simplified (A1), after which texture and color information may be added to the mesh yielding an image that may resemble image 115B. Data from image 115B can be sent to computing device 160 and headset 190 associated with user 180 (A2) through the cloud platform 150 so that a holographic image 115C based on data from image 115B can be rendered for viewing by user 180 (A3). As can be seen in image 115C, image 115B of the person is superimposed onto images of the environment surrounding a viewer or user 180. The mesh is shown in image 115C for emphasis although after rendering is complete, the mesh may not be visible to user 180 through the headset 190.

The GPU in computing device 110 may stream image data in the above-described manner at a high data rate to enable seamless viewing of holographic images by user 180.

The transceiver in computing devices 110 and 160 includes a transmitter and a receiver to communicate with other devices, e.g., depth sensors 120A, 120B, 170A, 170B and headsets 140, 190, and one or more networks, e.g., wireless network 155. The transceiver can include amplifiers, modulators, demodulators, encoders, decoders, antennas, and various other components. The transceiver can direct data received from other external devices, such as servers, databases, and electronic devices, to other components with in the computing device 110/160 such as a processor or memory. The transceiver can also direct data received from components within the computing device 110/160 to external devices.

Data from computing device 110 can be transmitted to and received from computing device 160 over a wireless network 155 and through a cloud platform 150. Data from computing device 160 can be transmitted to and received from computing device 110 over a wireless network 155 and through the cloud platform 150. In general, data from computing devices 110, 160 can be transmitted across various types of wired or wireless networks. In some implementations, data can be transmitted without using the cloud platform 150.

The cloud platform 150 can operate as a communication switching board. In particular, the cloud platform 150 can facilitate users 140, 180 to join holographic sessions and interconnect with others. The cloud platform 150 can host sessions on demand and scale to an unlimited number of concurrent sessions between various users quickly and efficiently.

In some implementations, the cloud platform 150 can include a gateway, a web portal, and a session server. The gateway can manage one or more databases that store user and session data. The user and session data can include data such as, for example, data indicative of users who are logged in into the VAR system 100, session information such as session start time, session duration, session topics, scheduled session times, users involved in a session, and IP and/or MAC addresses of user devices involved in the sessions. Data from a session can be stored with user authorization and can be recalled when a session is restored or when data from a past session is requested by a user.

The gateway can manage multiple session servers and can receive and transmit data to facilitate the streaming and rendering of holographic images. In some cases, the gateway can provide one or more application program interfaces (APIs) to user devices or system components such as the computing device 110, 160 or headsets 140, 190.

The web portal is a web interface for end users and administrators. Data for configuring the web portal can be provided by the gateway. Data sent and received through the portal can be transmitted to the gateway. Sessions servers can host real-time communication between users during a session.

In general, the cloud platform 150 can be implemented using one or more servers, databases, and/or computing devices to execute software and algorithms for implementing the operations described above. The cloud platform 150 can provide storage services for data transmitted between various components of the system 100, e.g., computing devices 110, 160. The cloud platform 150 can be integrated in one location or distributed in more than one location.

The wireless network 155 can connect the cloud platform 150 to computing devices 110, 160 associated with users 130, 180. In some implementations, the wireless network 155 may be the Internet. In general, the wireless network 155 can include various types of networks including short-distance networks such as Bluetooth and WiFi networks, and long distance networks, e.g., cellular networks or the Internet. In some implementations, the wireless network 155 can include a cloud system that includes the cloud platform 150.

The wireless network 155 can include access points, storage systems, cloud systems, modules, one or more databases including one or more media databases, and servers including one or more network servers. The one or more network servers can include any suitable computing device, including but not limited to a personal computer, a server computer, a series of server computers, a mini computer, and a mainframe computer, or combinations thereof. The one or more network servers can also include an application server or a series of servers. The one or more network servers can be used for and/or provide cloud and/or network computing services.

Although FIG. 1 depicts an example with two users and computing devices, in some implementations, only one computing device and/or only one headset can be used. For example, a single computing device can be used when one person has an avatar instead of a hologram or a person is lecturing in front of the depth sensors without the need of a headset.

Figure 2:
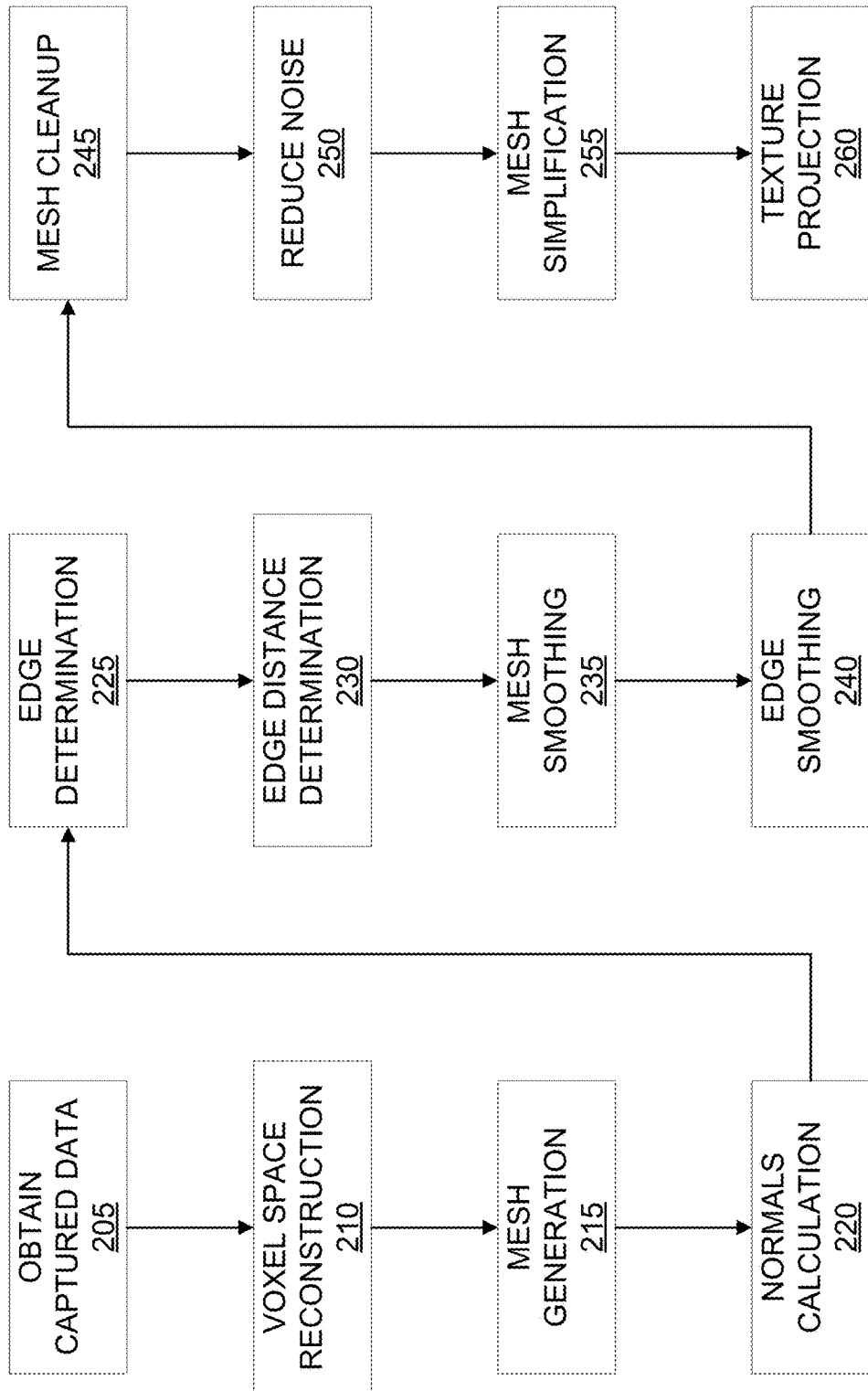
FIG. 2 depicts an example method for 3D holographic image reconstruction and a place in the pipeline for edge detection and smoothing in VAR images.

FIG. 2 illustrates an example flowchart for generating 3D holographic images including edge detection and smoothing in images. The operations described with respect to FIG. 2 can be executed by one or more computing devices such as computing device 110 or 160. In some implementations, the operations can be executed by a computing device in the cloud platform 150 or a computing device other than devices 110 or 160 that is coupled to headset 140 or 190. Unless otherwise noted, the user referred to in the discussion of FIG. 2 refers to user 140 or user 190. The depth sensors referred to in the discussion of FIG. 2 refer to the pair of depth sensors 120A and 120B or the pair of depth sensors 170A and 170B. The headset referred to in the discussion of FIG. 2 refers to headset 140 or headset 190.

The process shown in FIG. 2 begins with operation 205 in which data can be obtained from one or more depth sensors. The obtained data can include an image captured by cameras in the depth sensors. The data can also include color information and a depth value for each pixel (depth from the camera to that pixel). Various suitable methods, such as stereo triangulation, light triangulation, structured light, time of flight, or interferometry, can be used to determine the depth value.

The obtained data from the depth sensors can be used to construct a 3D image space or voxel space. In operation 210, the voxel space can be reconstructed by dividing the space in front of the cameras in a collection of small cubes. The computing device can divide the voxel space based on the depth value for each pixel.

Figure 3:
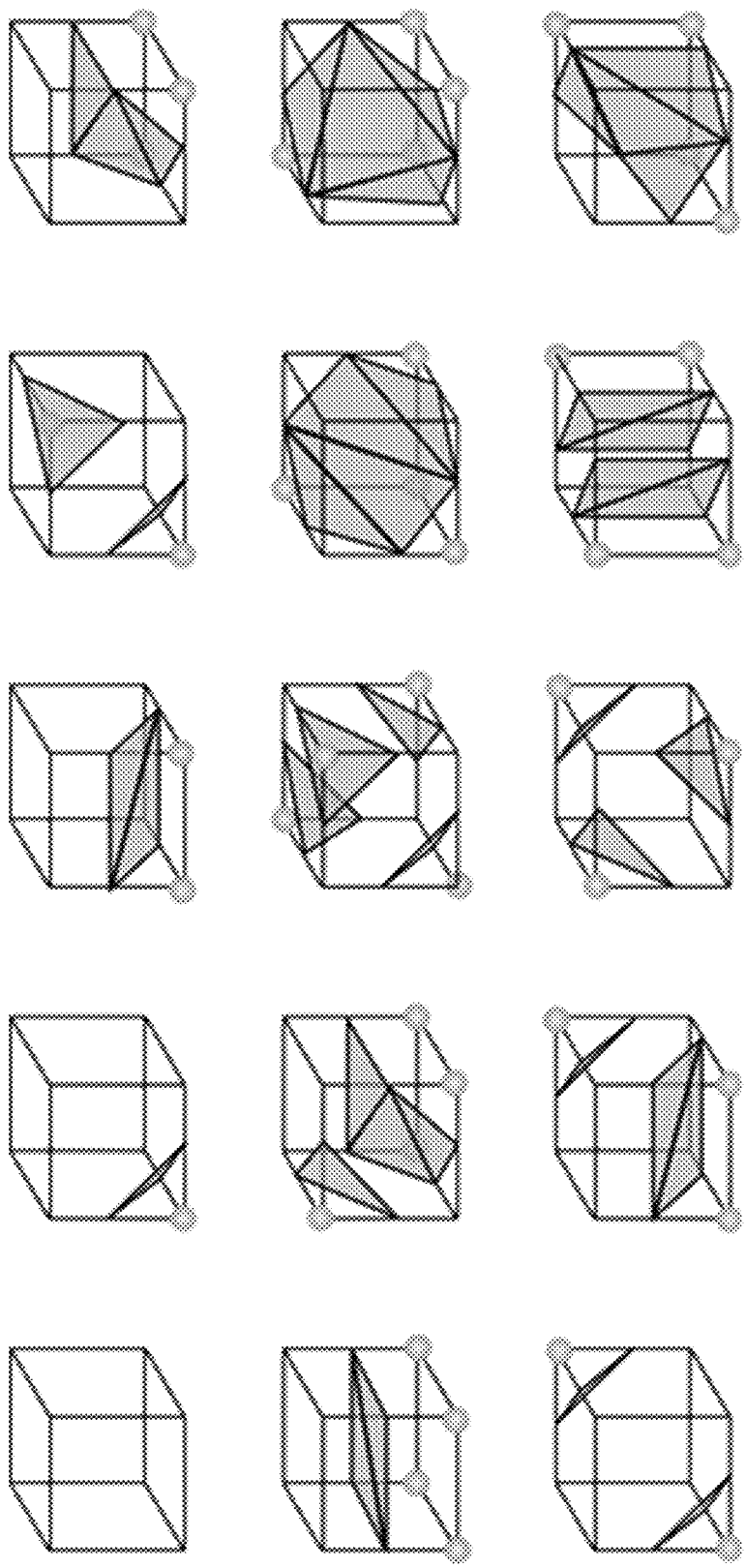
FIG. 3 depicts the unique cases of the MarchingCubes algorithm that can be used to generate a triangle mesh.

In operation 215, the small cubes can be converted into a mesh of triangles. A cube is formed of eight voxels. Triangles can be identified based on whether a voxel is filled or not. The MarchingCubes algorithm or other suitable techniques can be iteratively applied to each cube to identify triangles. FIG. 3 shows the 15 unique cases in the MarchingCubes algorithm that can be used to generate the triangle mesh. After processing all the cubes, the union of identified triangles, e.g., as identified by the MarchingCubes algorithm, can be used to generate a triangle mesh.

Next, in operation 220, characteristics of the triangles can be determined by calculating the normals of each triangle. A vertex refers to a corner of one of the identified triangles. Using the vertices of each triangle, the vectors formed by the vertices of a triangle can be used to generate the normal for the triangle. In this triangle mesh, normals for a particular triangle can be calculated as a weighted average of the normals of triangles that touch the particular triangle and the determined normal for just the particular triangle.

In operation 225, edges of the triangle mesh can be determined. For each vertex, the computing device can determine what the neighboring vertices (vertices that are one vertex away from the vertex) are and whether a neighboring vertex and the vertex share a common triangle. When a pair of vertices share two triangles, the vertices are determined to be in the middle of the triangle mesh. When the pair of vertices only share a single triangle, those vertices are determined to be at an edge of the triangle mesh.

Figure 4:
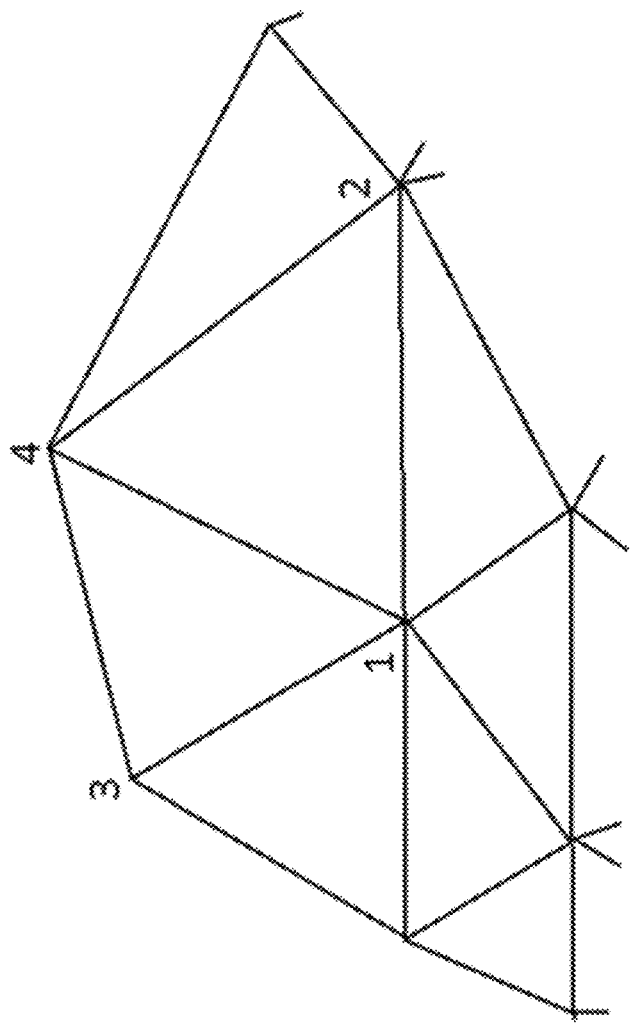
FIG. 4 depicts a portion of an example triangle mesh.

For example, FIG. 4 depicts a portion of an example triangle mesh 400. The computing device can determine that vertices 3 and 4 are located at an edge of the mesh because they only share a single triangle. The computing device can also determine that vertices 1 and 2 are somewhere in the middle of the mesh because vertices 1 and 2 share two triangles. Vertices 3 and 4 can be designated as edge nodes and vertices 1 and 2 can be designated as internal nodes.

In operation 230, the computing device can determine the distance to an edge for each internal node, i.e., vertex is on the inside of the mesh. The distance can be described in various ways, including e.g., a number of hops to get to the edge from the vertex. In some implementations, the distance can be determined by adding one hop to the determined distance of a neighboring vertex. If there are multiple neighboring vertices, the minimum distance obtained from the distances of the neighboring vertices can be used. Multiple iterations of this determination can be performed for each internal node to correctly determine the distance to an edge for each internal node. In some implementations, edge distance determination can be performed in parallel for each vertex.

After determining the edges in operation 225 and the distance to the edges in operation 230, the computing device can optionally perform mesh smoothing in operation 235. To smooth the triangle mesh, the computing device can determine, for each vertex to be smoothened, the average location of the vertices that share a triangle with the vertex. The current location of the vertex is then modified to bring it closer to the average location of the vertices that share a triangle with the vertex.

In operation 240, the edges can be smoothened. Smoothing can be applied to each vertex that is a located a determined number of hops, e.g., 3 hops, from the edge. The determined number of hops can be adjusted by an operator of the VAR system 100 to vary the degree of edge smoothing.

To perform edge smoothing, the average location of vertices that are a determined number of hops away from the edge is determined. The normal associated with an edge and the location of vertices associated with the edge can be adjusted to smoothen the edge. In more detail, for each vertex that is a located a determined number of hops from the edge, the computing device can determine the average of the location of the vertices that share a triangle and that have the same distance from the edge as the vertex being processed. Based on the determined average location, the location coordinates of vertices of an edge can be adjusted to bring the vertices closer to the average location. And with new vertices locations, normals for triangles can also be recalculated.

In some implementations, Equation 1 can be used to perform edge smoothing.

$$v_f = \frac{v_i + \Sigma^N 0.2\, v_n}{1 + 0.2\, N} \quad \text{Equation 1}$$

In Equation 1, $v_i$ is a current location of a vertex being processed; $v_f$ is the location to which the vertex should be moved; $v_n$ is the n-th neighboring vector with the same distance to an edge as the vertex being processed; and N is the number of neighboring vertices with the same distance to the edge as the vertex being processed.

Figure 5A:
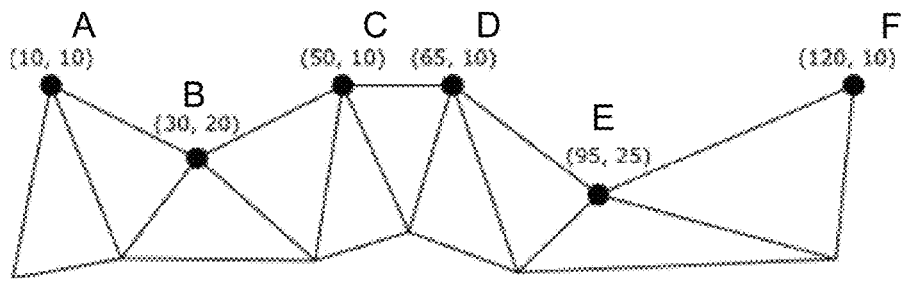
FIGS. 5A, 5B, 5C, and 5D depict an example of edge smoothing.
Figure 5B:
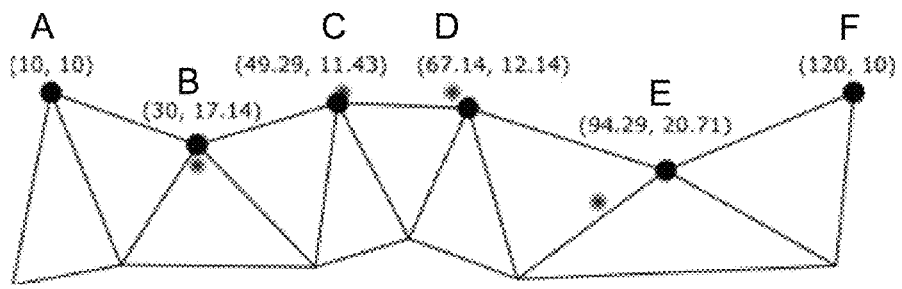

FIGS. 5A-5D show one example of edge smoothing. In FIGS. 5A-5D, a portion of a triangle mesh is shown. The portion includes vertices A, B, C, D, E, and F. For illustration purposes, only two-dimensional (2D) coordinates of the vertices are shown. In FIG. 5A, vertex A has coordinates of (10, 10); vertex B has coordinates of (30, 20); vertex C has coordinates of (50, 10); vertex D has coordinates of (65, 10); vertex E has coordinates of (95, 25); and vertex F has coordinates of (120, 10).

After one round of determining the locations of the vertices, edge smoothing is performed by modifying the locations of one or more vertices in the manner described above. The location of vertex B has been changed from (30, 20) in FIG. 5A to (30, 17.14) in FIG. 5B moving vertex B closer to the location of neighboring vertices A and C. Similarly, the location of vertex C has been changed from (50, 10) to (49.29, 11.43) moving vertex C closer to the location of neighboring vertices B and D; the location of vertex D has been changed from (65, 10) to (67.14, 12.14) moving vertex D closer to the location of neighboring vertices C and E; and the location of vertex E has been changed from (95, 25) to (94.29, 20.71) moving vertex E closer to the location of neighboring vertices D and F.

Figure 5C:
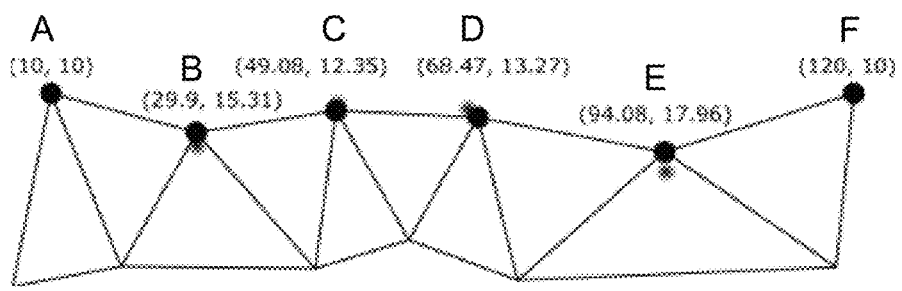
Figure 5D:
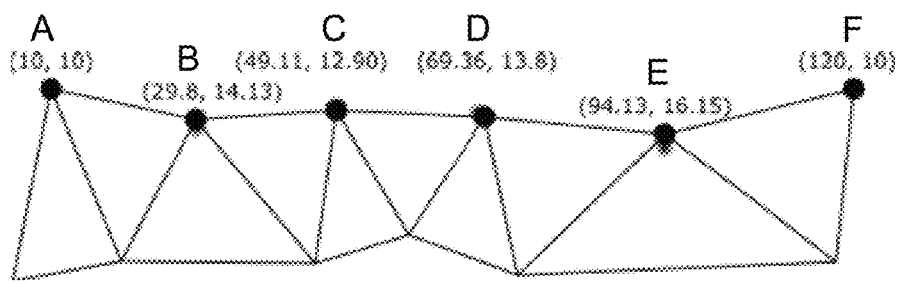

FIGS. 5C and 5D show another two iterations of the edge smoothing step. After performing multiple iterations, the edges of the mesh have smoothened out as can be seen by comparing FIGS. 5A to 5D. Edge smoothing can be repeatedly performed for a fixed number of iterations that can be variably set. Advantageously, the smoothing operation is effectively a filtering operation that removes noise from the mesh thereby improving the overall quality of rendered images.

Figure 6A:
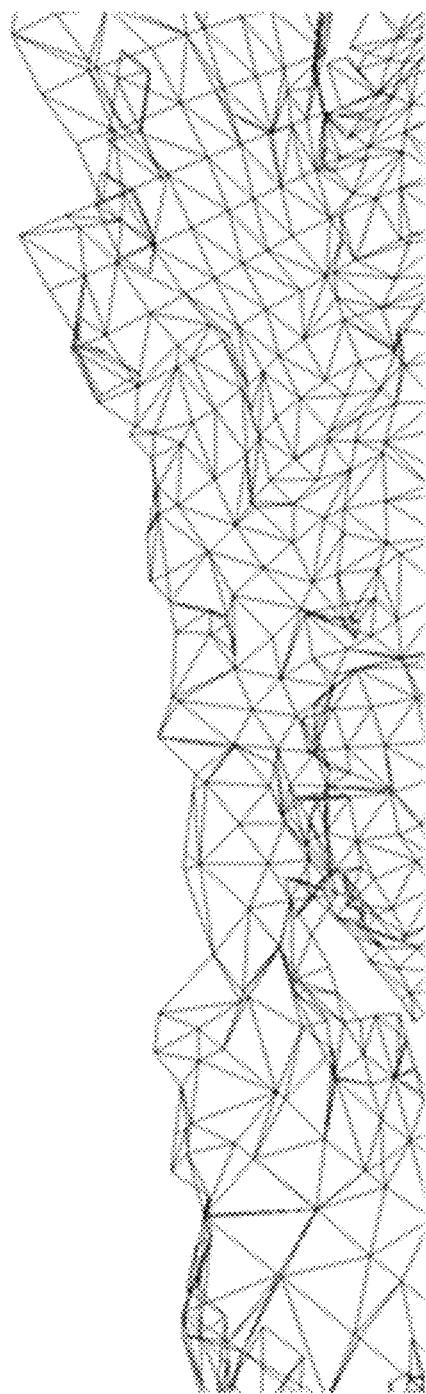
FIGS. 6A and 6B depict an example of edge smoothing.
Figure 6B:
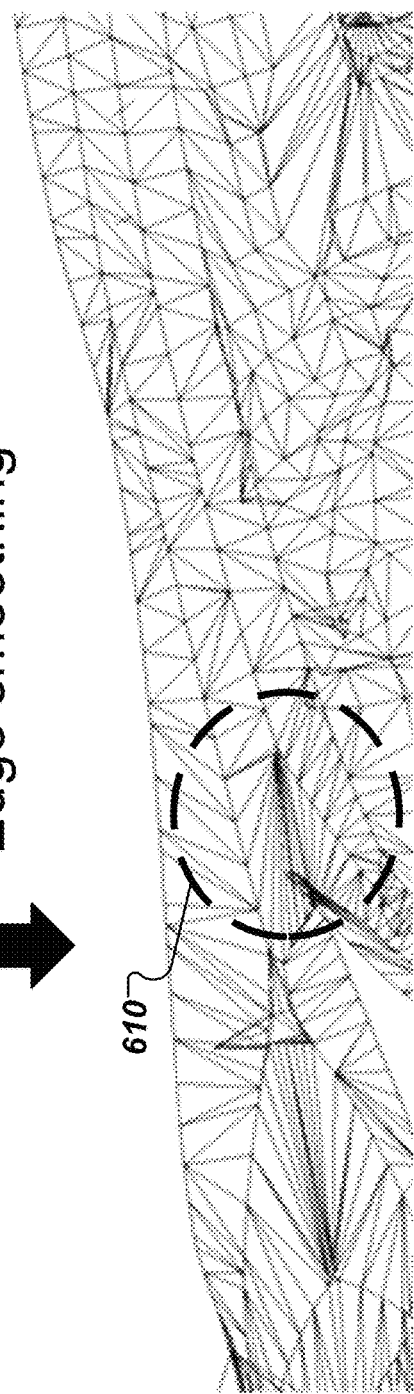

Another example of the edge smoothing operation is shown in FIGS. 6A and 6B. FIG. 6A shows a portion of a triangle mesh that has not been smoothened. FIG. 6B shows the same portion of the triangle mesh after edge smoothing is performed. As shown in FIGS. 6A and 6B, this edge smoothing operation can result in the removal of sharp and noisy edges and the creation of smooth bands of triangles around the mesh.

Operation 240 can be performed for all voxels simultaneously and can be repeated for a determined number of iterations that can be set by an operator of the VAR system 100. After the determined number of iterations are complete, some vertices can be located very close to each other. An example of the close proximity of vertices is highlighted by the dashed circle 610 shown in FIG. 6B. Such instances of closely located vertices are not necessary.

In operation 245, the mesh can be cleaned up by merging the vertices that are less than a threshold distance apart from each other such as some the vertices within circle 610. After merging the vertices, new triangles can be generated. And to further clean up the mesh, an operation 250 can be performed to remove triangles that form a submesh of a few triangles. A submesh is a portion of a mesh that only consists of edges and no inside triangles. Operation 250 can further reduce noise in the mesh.

After the mesh is cleaned up and noise is removed, the mesh can be further simplified in operation 255. To simplify the mesh, vertices and triangles that do not substantially contribute to the shape of the mesh are removed. To determine the contribution of vertices and triangles, the computing device can identify pairs of vertices that belong to the same triangle and can calculate the effect on the mesh when the two vertices are merged. The effect can be calculated by determining the change in angle between all neighboring triangles before and after the merge. For example, vertices associated with a flat surface will have no effect, whereas vertices at the top of a nose will likely have a larger effect. When the amount of change is less than a threshold, the vertices can be merged.

Figure 7A:
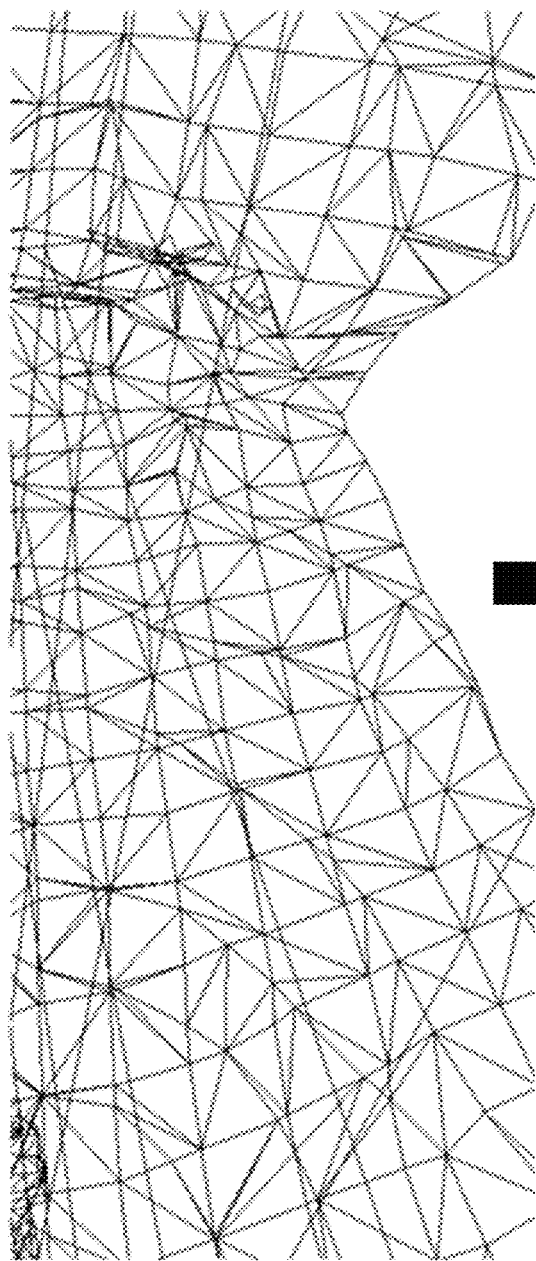
FIGS. 7A and 7B depict an example of mesh simplification.
Figure 7B:
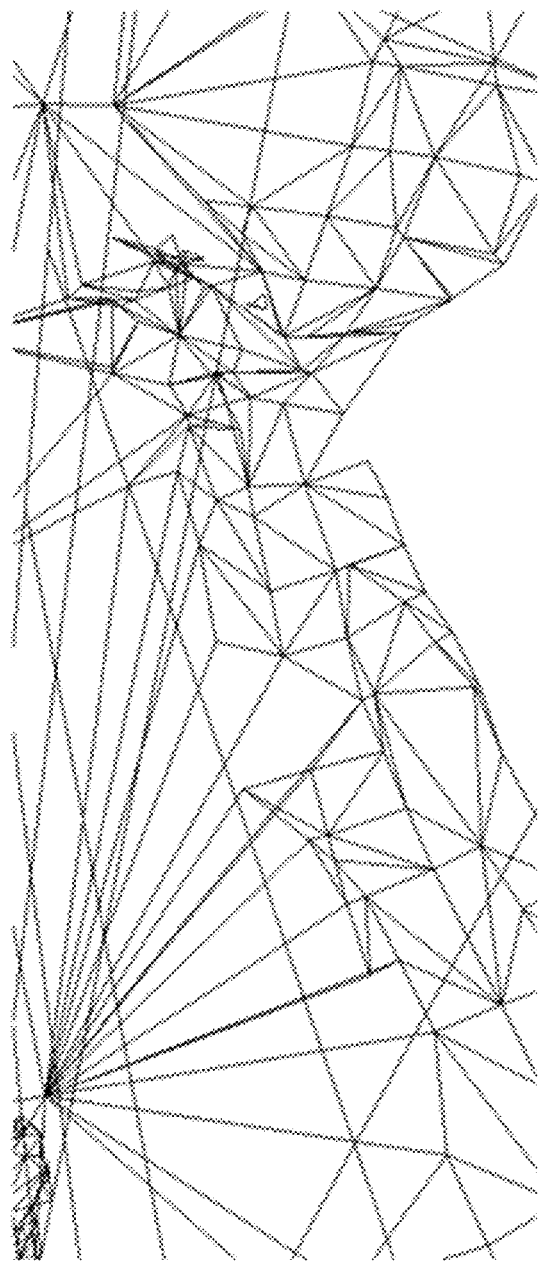

An example of the mesh simplification operation 255 is shown in FIGS. 7A and 7B. FIG. 7A shows a portion of a triangle mesh that has not been simplified. FIG. 7B shows the same portion of the triangle mesh after mesh simplification is performed. As shown in FIG. 7B, the resulting mesh has fewer vertices, triangles, and edges.

During operation 255, vertices on the edge of the mesh are not merged to preserve the edge and overall shape of the mesh. Vertices located close to the edge can only be merged with vertices that are the same distance to the edge. Triangles with an area of zero are removed. The mesh simplification operation 255 can be repeated for a determined number of iterations that can be set by an operator of the VAR system 100.

In operation 260, texture projection can be applied on the mesh. To perform this operation, the computing device can determine which colors and cameras to use per vertex to project colored images on the mesh. The computing device can additionally determine the camera weight for each vertex. Camera weight refers to a numeric value corresponding to how much each camera of the depth sensors can contribute to the color of a vertex.

For the front of the mesh, both cameras can contribute equally, but the edges will only have a contribution of one camera. The weight of each camera per vertex can be determined by the computing device based on the angle between the mesh and the camera viewing direction, the difference between the depth value of the camera and the actual distance from the camera to the vertex, and the distance to the edge of the image.

After performing the operations shown in FIG. 2, the computing device can store data indicative of the camera weights, colors, vertex locations, depth data, and any other information, e.g., distance to the edge of the mesh per vertex, triangle locations, that can be used to recreate the mesh. This data can be transmitted over the wireless network 155 to a viewer, e.g., user 130 or 180, of the mesh. The transmitted data can be decoded and processed by a computing device that receives the transmitted data for rendering. The mesh is recreated by the GPU of the receiving computing device and color images are projected on top of the mesh. The camera weights can be used to determine how the colors of the different cameras are mixed together for each vertex. The distance to the edge can determine extra mixing effects, for example transparency around the edges of the mesh. Close to the edge, a very transparent rendering can be applied so the mesh seems to fade in space and hides errors around the edges.

By using the above-described method of rendering a holographic image, the viewer can enjoy a higher quality holographic image due to less noise in the image. Additionally, because the above-described operations introduce less than 50 milliseconds of latency, this method can be used for real-time communication such as streaming HD data.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed ASICs (application-specific integrated circuits).

A computer-readable medium can be a machine-readable storage device, a machine-readable storage substrate, a memory device, a composition of matter effecting a machine-readable propagated signal, or a combination of one or more of them. The term "computing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data in a single file dedicated to the program in question, or in multiple coordinated files. A computer program can be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Moreover, a computer can be embedded in another device, e.g., a tablet computer, a mobile telephone, a personal digital assistant (PDA), a mobile audio player, a VAR system, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and may even be claimed as such, one or more features from a claimed combination can, in some cases, be excised from the combination, and the claimed combination may be directed to a sub-combination or variation of a sub-combination. For example, although the mapping operation is described as a series of discrete operations, the various operations can be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems can generally be integrated together in a single software product or packaged into multiple software products.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget can be described as having a first side and a second widget can be described as having a second side. The use of the term "second side" with respect to the second widget can distinguish such side of the second widget from the "first side" of the first widget and not to connote that the second widget has two sides.

What is claimed is:

1. A computer-implemented method comprising:
   obtaining image data from a pair of cameras;
   determining a mesh of triangles from the image data;
   performing mesh smoothing and edge smoothing to remove noise from the mesh of triangles;
   removing one or more vertices from the mesh that have a mesh contribution value that does not satisfy a contribution threshold, the mesh contribution value being indicative of a contribution of the one or more vertices to a shape of the mesh of triangles;
   storing, in a memory, mesh data that characterizes the mesh after the removing of the one or more vertices from the mesh; and
   transmitting the mesh data to a rendering device configured to render a holographic image based on the mesh data.

2. The computer-implemented method of claim 1, comprising determining edges for the triangles by:
   for each vertex in the mesh:
      determining a neighboring vertex that is located one vertex away from the vertex;
      determining whether the neighboring vertex and the vertex share a common triangle;
      determining that the neighboring vertex and the vertex are internal nodes of the mesh when the neighboring vertex and the vertex are shared by at least two triangles; and
      determining that the neighboring vertex and the vertex are external nodes of the mesh when the neighboring vertex and the vertex are part of one triangle.

3. The computer-implemented method of claim 2, comprising determining, for each internal node, a distance to an edge of the mesh, wherein the distance is a number of hops to get to the edge from the internal node.

4. The computer-implemented method of claim 1, wherein performing mesh smoothing and edge smoothing comprises:
   for each vertex:
      determining an average location of vertices that share a triangle with the vertex; and
      modifying a location of the vertex to be closer to the average location of the vertices that share a triangle with the vertex.

5. The computer-implemented method of claim 1, wherein performing mesh smoothing and edge smoothing comprises:
   identifying a vertex located a determined number of hops from a particular edge of the mesh;
   identifying other vertices that share a triangle and that are located the determined number of hops from the particular edge;
   determining an average location of the other vertices; and
   modifying a location of the vertex such that the location of the vertex is closer to the average location.

6. The computer-implemented method of claim 1, comprising:
   determining that two vertices are separated by a distance that is less than a threshold distance; and
   merging the two vertices.

7. The computer-implemented method of claim 1, wherein removing one or more vertices from the mesh that have a mesh contribution value that does not satisfy the contribution threshold comprises:
   identifying a pair of vertices that belong to the same triangle;
   determining an effect on the mesh if the pair of vertices are merged; and
   determining that the effect on the mesh is less than the contribution threshold.

8. The computer-implemented method of claim 7, wherein determining the effect on the mesh when the pair of vertices are merged comprises determining a change in angle between all neighboring triangles before and after the pair of vertices are merged.

9. The computer-implemented method of claim 1, comprising removing one or more triangles from the mesh before removing the one or more vertices by removing one or more triangles that form a submesh in the mesh.

10. The computer-implemented method of claim 1, wherein the mesh data comprises data indicative of color in one or more images and depth from the pair of cameras to a pixel in the one or more images.

11. A virtual or augmented reality system, comprising:
    a frame structure comprising a pair of depth sensors configured to obtain image data;
    a computing device coupled to the frame structure, the computing device configured to:
       obtain image data from the pair of depth sensors;
       determine a mesh of triangles from the image data;

perform mesh smoothing and edge smoothing to remove noise from the mesh of triangles; and
remove one or more vertices from the mesh that have a mesh contribution value that does not satisfy a contribution threshold, the mesh contribution value being indicative of a contribution of the one or more vertices to a shape of the mesh of triangles;
a memory configured to store mesh data that characterizes the mesh after removing the one or more vertices from the mesh; and
a headset configured to render a holographic image based on the mesh data.

12. The virtual or augmented reality system of claim 11, wherein the computing device is configured to transmit the mesh data to one or more rendering devices configured to render the holographic image based on the mesh data, the one or more rendering devices comprising the headset.

13. The virtual or augmented reality system of claim 11, wherein, to determine edges for the triangles, the computing device is configured to:
for each vertex in the mesh:
determine a neighboring vertex that is located one vertex away from the vertex;
determine whether the neighboring vertex and the vertex share a common triangle;
determine that the neighboring vertex and the vertex are internal nodes of the mesh when the neighboring vertex and the vertex are shared by at least two triangles; and
determine that the neighboring vertex and the vertex are external nodes of the mesh when the neighboring vertex and the vertex are part of one triangle.

14. The virtual or augmented reality system of claim 11, wherein, to perform the mesh smoothing and edge smoothing, the computing device is configured to:
for each vertex:
determine an average location of vertices that share a triangle with the vertex; and
modify a location of the vertex to be closer to the average location of the vertices that share a triangle with the vertex.

15. The virtual or augmented reality system of claim 11, wherein, to perform the mesh smoothing and edge smoothing, the computing device is configured to:
identify a vertex located a determined number of hops from a particular edge of the mesh;
identify other vertices that share a triangle and that are located the determined number of hops from the particular edge;
determine an average location of the other vertices; and
modify a location of the vertex such that the location of the vertex is closer to the average location.

16. A non-transitory computer-readable storage medium comprising instructions, which, when executed by one or more computing devices, cause the one or more computing devices to perform operations comprising:
obtaining image data from a pair of cameras;
determining a mesh of triangles from the image data;
performing mesh smoothing and edge smoothing to remove noise from the mesh of triangles;
removing one or more vertices from the mesh that have a mesh contribution value that does not satisfy a contribution threshold, the mesh contribution value being indicative of a contribution of the one or more vertices to a shape of the mesh of triangles;
storing, in a memory, mesh data that characterizes the mesh after the removing of the one or more vertices from the mesh; and
transmitting the mesh data to a rendering device configured to render a holographic image based on the mesh data.

17. The non-transitory computer-readable storage medium of claim 16, wherein the one or more computing devices is configured to determine edges for the triangles by:
for each vertex in the mesh:
determining a neighboring vertex that is located one vertex away from the vertex;
determining whether the neighboring vertex and the vertex share a common triangle;
determining that the neighboring vertex and the vertex are internal nodes of the mesh when the neighboring vertex and the vertex are shared by at least two triangles; and
determining that the neighboring vertex and the vertex are external nodes of the mesh when the neighboring vertex and the vertex are part of one triangle.

18. The non-transitory computer-readable storage medium of claim 16, wherein performing mesh smoothing and edge smoothing comprises:
for each vertex:
determining an average location of vertices that share a triangle with the vertex; and
modifying a location of the vertex to be closer to the average location of the vertices that share a triangle with the vertex.

19. The non-transitory computer-readable storage medium of claim 16, wherein performing mesh smoothing and edge smoothing comprises:
identifying a vertex located a determined number of hops from a particular edge of the mesh;
identifying other vertices that share a triangle and that are located the determined number of hops from the particular edge;
determining an average location of the other vertices; and
modifying a location of the vertex such that the location of the vertex is closer to the average location.

20. The non-transitory computer-readable storage medium of claim 16, wherein removing one or more vertices from the mesh that have a mesh contribution value that does not satisfy the contribution threshold comprises:
identifying a pair of vertices that belong to the same triangle;
determining an effect on the mesh if the pair of vertices are merged; and
determining that the effect on the mesh is less than the contribution threshold by determining a change in angle between all neighboring triangles before and after the pair of vertices are merged.

* * * * *